Dec. 16, 1958  A. M. WILLIAMS  2,864,117
DUST PAN
Filed Sept. 28, 1955
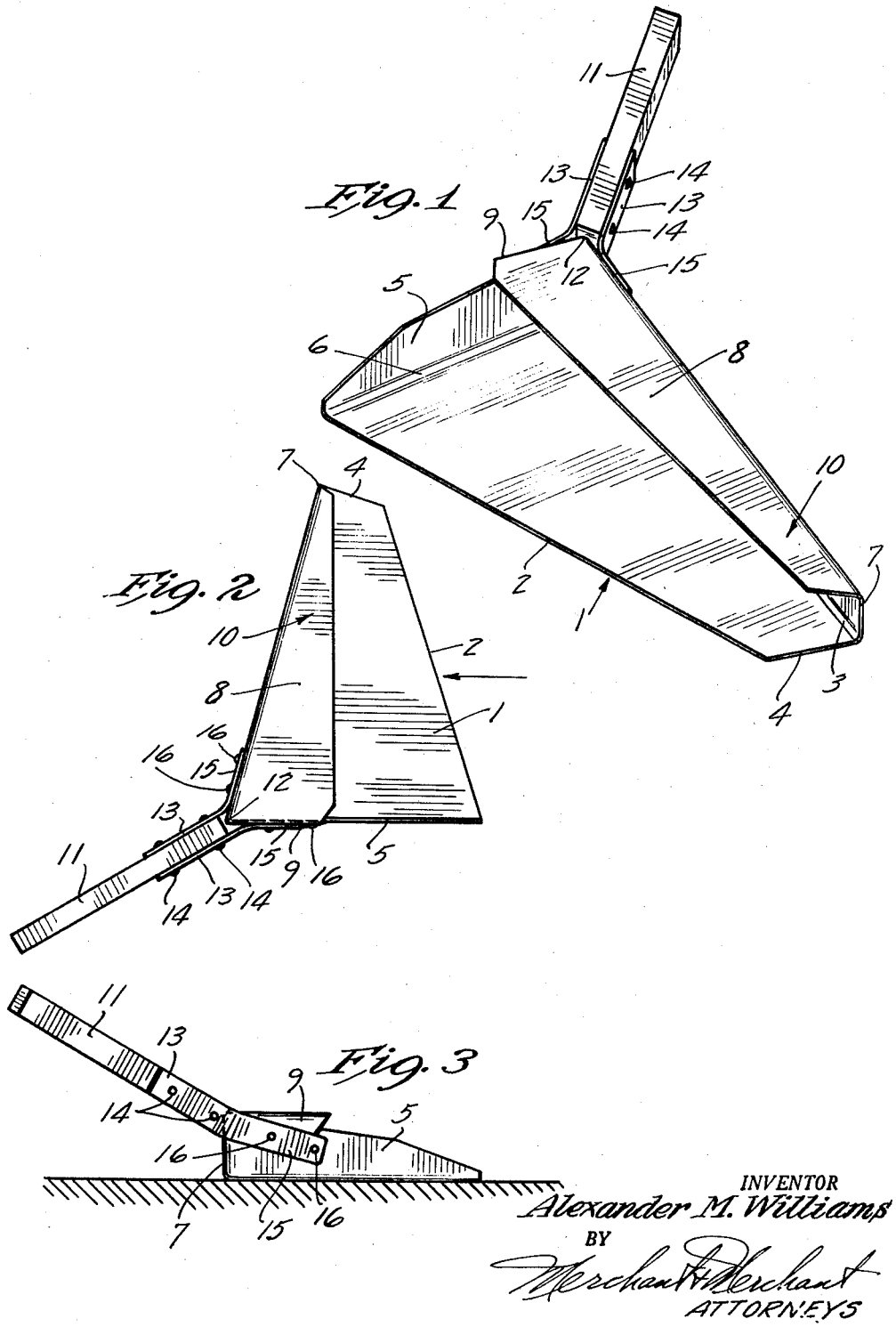
INVENTOR
Alexander M. Williams
BY
Merchant & Merchant
ATTORNEYS

United States Patent Office 2,864,117
Patented Dec. 16, 1958

2,864,117

DUST PAN

Alexander M. Williams, Watertown, S. Dak.

Application September 28, 1955, Serial No. 537,126

1 Claim. (Cl. 15—257.3)

My invention relates to improvements in dust pans and has for its primary object the provision of an inexpensive yet highly efficient, device of this character, which may be utilized with a minimum of effort.

More specifically, the object of my invention is the provision of a dust pan which requires in use a minimum of bending over, and which may be held in the hand of the user when his arm is in its natural dangling position, for purposes of dirt picked up, and emptied by a mere twist of the wrist in an outward direction from the body.

A further object of my invention is the provision of a dust pan that can be emptied by pouring the contents through a laterally and forwardly extending spout, instead of emptying it over the wide front edge in the conventional manner—thus making it possible to pour the contents even into receptacles having small openings.

Still more specifically, the object of my invention is the provision of a dust pan having an irregular quadrilateral bottom having two elongated converging sides, one of which provides the forward edge of the bottom and the other of which provides the rear edge of the pan, and in which said rear edge is provided with an upstanding rear wall, said rear wall being bent along its upper edge in overlying relation to the bottom and defining with said bottom and rear wall a continuous pouring spout which projects forwardly and laterally outwardly from the handle at an oblique angle to facilitate pouring.

A still further object of my invention is the provision of a device of the class immediately above described in which the short side of said bottom is provided with an upstanding side wall, the rear end portion of which co-operates with said overlying portion of the rear wall to provide a closed end for said pouring spout.

The above and still further objects of my invention will become apparent from the following detailed specification, appended claims and attached drawings.

Referring to the drawings, wherein like characters are indicated by like parts throughout the several views:

Fig. 1 is a perspective view of my novel pan;

Fig. 2 is a view in top plan; and

Fig. 3 is a view in side elevation.

Referring with greater particularity to the drawings, the numeral 1 indicates an irregular quadrilateral bottom having converging elongated sides 2 and 3, the former of which provides the front edge of the pan and the latter of which provides the rear edge thereof. Preferably and as shown, the reduced end portion of the bottom 1 is cut off angularly as at 4.

Bottom 1 preferably is formed from flexible sheet metal and has an upstanding side wall 5, along the short side 6. Formed integrally with and upstanding from the rear edge 3 of the quadrilateral bottom 1 is a rear wall 7, the upper edge portion 8 of which is bent forwardly in overlying parallel relation to the bottom 1. The upper edge portion 8 overlies an end portion of the side wall 5 and has a downturned section 9 which is secured thereto by any suitable means, such as solder. Also, preferably and as shown, the overlying portion 8 is connected to the upstanding rear wall 7 and extends from the side wall 5 to the end of the elongated pouring spout 10, formed by the elements 1, 7 and 8.

A handle 11 projects upwardly and rearwardly from the point of joinder of the side wall 5 and rear wall 7, indicated by the numeral 12. Obviously, the handle 11 may be secured in position by any suitable means, but, as shown, this is accomplished by means of a pair of metallic straps 13, the rear ends of which are secured to opposite sides of the handle 11 by means of rivets or the like 14, and the diverging forward ends 15 of which are secured one each to the sidewall 5 and the rear wall 7, also by means of rivets or the like 16.

It will be noted that the handle 11 is disposed at oblique angles with respect to both the rear wall 7 and the side wall 5. This is extremely important and enables the operator to both hold the pan and dump the contents of same with a minimum of effort, as will hereinafter become apparent.

While my pan may obviously be made to accommodate right and left hand users, by mere reversal of the parts thereof, the one shown in the drawings is constructed for use by a right-handed person. Hence, said pan is to be gripped in the left hand to receive the dust and other debris swept therein by a broom of the operator which is held in his right hand. The sweepings would be lifted into the bottom 1 in the direction of the arrow of Fig. 2, whereby to be caused to impinge against either the side wall 5 or the rear wall 7 at a point of maximum coverage provided by the overlying portion 8. When it is desired to dump the contents of my novel pan, it is but necessary, even without straightening up, for the sweeper to move his arm laterally and twist his wrist so as to precipitate the contents into a suitable receptacle, even those, as above indicated, having small openings.

My invention has been thoroughly tested and found to be completely satisfactory for the accomplishment of the above objects, and while I have shown a preferred embodiment thereof, I wish it to be specifically understood that same is capable of modification without departure from the scope and spirit of the appended claims.

What I claim is:

A dust pan formed from a single sheet of material providing a flat, irregular, quadrilateral, bottom wall having straight converging front and rear side edges which approach each other to form one wall and discharge end of a pouring spout, said sheet material extending upwardly from said bottom between the divergent ends thereof to provide one side wall of the pan, said sheet material also extending upwardly along the rear edge to form a second side wall, said second side wall abutting said one side wall and having a forwardly extending wall portion overlying a substantial portion of said bottom wall between said discharge end of said pouring spout and said one side wall of the pan, said forwardly extending wall portion also overlying said one side wall and having a downturned section secured to the outer side of said one side wall adjacent the abutting ends of said side walls, a handle projecting upwardly and rearwardly from said abutting ends of said side walls and having divergent strap portions embracing each of said walls and rigidly connected thereto.

References Cited in the file of this patent

UNITED STATES PATENTS

| 67,019 | Brigham | July 23, 1867 |
| 280,990 | Wynkoop | July 10, 1883 |
| 299,294 | Sweetson | May 27, 1884 |
| 325,304 | Wynkoop | Sept. 1, 1885 |
| 704,861 | Correll | July 15, 1902 |
| 958,255 | Koertner | May 17, 1910 |